United States Patent [19]
Karpen et al.

[11] Patent Number: 5,949,054
[45] Date of Patent: *Sep. 7, 1999

[54] BAR CODE READER FOR READING HIGH TO LOW CONTRAST BAR CODE SYMBOLS

[75] Inventors: Thomas W. Karpen; William H. Havens, both of Skaneateles; Dennis W. McEnery, Marcellus; Brian L. Jovanovski, Syracuse, all of N.Y.

[73] Assignee: Welch Allyn, Inc., Skaneateles Falls, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/546,588

[22] Filed: Oct. 23, 1995

[51] Int. Cl.$^6$ .................................................. G06K 7/10
[52] U.S. Cl. .................. 235/462.25; 235/462.01; 235/462.26; 235/462.06; 235/462.27
[58] Field of Search ................ 235/463, 462, 235/472, 462.01, 462.25, 462.26, 462.06, 462.27

[56] References Cited

U.S. PATENT DOCUMENTS

| | | | |
|---|---|---|---|
| 4,147,295 | 4/1979 | Nojiri et al. | 235/463 |
| 4,219,152 | 8/1980 | Couch et al. | 235/463 |
| 4,245,152 | 1/1981 | Flurry et al. | 235/463 |
| 4,323,772 | 4/1982 | Serge | 235/463 |
| 4,387,298 | 6/1983 | Petersen et al. | 235/462 |
| 4,689,490 | 8/1987 | Thomas et al. | 250/566 |
| 4,740,675 | 4/1988 | Brosnan et al. | 235/462 |
| 4,749,879 | 6/1988 | Peterson et al. | 307/354 |
| 5,200,597 | 4/1993 | Eastman et al. | 235/472 |
| 5,272,323 | 12/1993 | Martino | 235/462 |
| 5,294,783 | 3/1994 | Hammond, Jr. et al. | 235/462 |
| 5,317,166 | 5/1994 | Tafoya | 235/467 |
| 5,382,783 | 1/1995 | Bremer | 235/462 |
| 5,389,770 | 2/1995 | Ackley | 235/462 |
| 5,397,885 | 3/1995 | Massieu et al. | 235/472 |
| 5,412,197 | 5/1995 | Smith | 235/462 |
| 5,449,893 | 9/1995 | Bridgelall et al. | 235/462 |
| 5,457,309 | 10/1995 | Pelton | 235/462 |
| 5,504,315 | 4/1996 | Hardesty et al. | 235/462 |
| 5,581,072 | 12/1996 | Bridgelall et al. | 235/462 |
| 5,661,288 | 8/1997 | Keinath et al. | 235/436 |

*Primary Examiner*—Thien Minh Le
*Assistant Examiner*—Douglas X. Rodriguez
*Attorney, Agent, or Firm*—Wall Marjama Bilinski & Burr

[57] ABSTRACT

A bar code reader is provided which can read bar code symbols of varying contrast, from high to medium to low contrast. The bar code reader includes a digitizing circuit which digitizes an analog signal representing the reflectance function of a scanned bar code by comparing the analog signal to a threshold signal. In the present invention, the threshold signal is switchable between a first state wherein the threshold signal is a standard threshold signal suitable for digitizing analog signals representing medium to high contrast bar code symbols and a second state wherein the threshold signal is a non-standard threshold signal suitable for digitizing analog signals representing low contrast bar code symbols. In one embodiment of the invention, the threshold signal is manually adjustable. In another embodiment, a bar code reader is provided which automatically digitizes and decodes bar code symbols of varying contrast by repetitively scanning bar code symbols, using first and second alternating threshold signal states to digitize the analog signal resulting from each scan.

17 Claims, 5 Drawing Sheets

BAR CODE READER FOR READING HIGH TO LOW CONTRAST BAR CODE SYMBOLS

BACKGROUND OF THE INVENTION

1. Field of the Invention

The present invention relates to a bar code reader for reading lower quality bar code symbols, and particularly to a bar code reader for reading bar code symbols that may vary in contrast, from high to medium to low contrast bar code symbols.

2. Description of the Prior Art

In one common technique employed for reading bar code symbols, a continuous analog signal representing the reflectance function of a bar code symbol is digitized by presenting the continuous analog signal to a comparator along with a threshold voltage. The comparator has a first logical level output when the amplitude of the continuous analog signal exceeds that of the threshold, and a second logical level output when the amplitude of the reference threshold exceeds that of the waveform. Several references, for example, U.S. Pat. No. 4,323,772 to Serge, U.S. Pat. No. 4,245,152 to Flurry et al., U.S. Pat. No. 4,219,152 to Couch et al., and U.S. Pat. No. 4,147,295 to Nojiri et al. all describe bar code digiti zing systems of this general configuration.

When the scanned bar code symbol is a high-quality, high contrast bar code symbol, local maxima and minima of the processed analog signal rise to points well above or well below the value of the threshold, and thus are readily digitized by the comparator.

However, when the bar code symbol is a low contrast bar code symbol, local maxima of the analog signal often fail to exceed the value of the threshold. Consequently, comparators employed to digitize continuous analog waveforms representing the output of an image sensor often fail to digitize localized maximum points from low contrast analog signals.

Low contrast of a bar code symbol may result from defective printing or imprinting of a bar code symbol, poor (including excessive or insufficient) lighting conditions, dirt or debris accumulating on a bar code symbol, smudging or running of a bar code, or fading of a bar code symbol. Bar code symbols imprinted on garments that are subjected to repeated washing are especially susceptible to fading and low contrast conditions.

Thus, there is a need for a bar code reader which may or may not include decoding circuitry that may vary in contrast sensitivity in order to digitize bar code symbols as described previously.

SUMMARY OF THE INVENTION

A high contrast bar code symbol is comprised of a series of dark or black elements which contrast sharply with and are separated by white elements. In a low contrast bar code symbol, the difference in contrast between the black elements and white elements is significantly reduced. Low contrast black bar code symbols are comprised of white elements and grayish black elements, while low contrast white bar code symbols have grayish white elements and black elements. The contrast between black and white elements of a bar code symbol is measured quantitatively by the minimum reflective difference (MRD). MRD is defined as the difference in reflectivity between the lightest black element and the darkest white element. One can define high contrast bar code symbols as having MRD's above 75 percent difference, low contrast bar code symbols as having MRD's below 50 percent difference, and medium contrast bar code symbols as having MRD's between 50 and 75 percent difference.

According to its major aspects and broadly stated, the present invention is a bar code reader that is adapted to read bar code symbols, from high, to medium, to low MRD.

Signals from bar code imaging systems are commonly digitized by constructing a continuous analog signal from the output of an image sensor, and inputting the continuous analog signal into a comparator along with a threshold voltage. This threshold voltage is generated by a threshold generating block, and may be determined by one of several possible methods. When a high quality, high contrast bar code is scanned, the comparator successfully generates a digital representation of the scanned image because local maxima and minima of the processed continuous analog signal are well above or fall well below the threshold voltage. However, when image sensor signals from a low contrast white or low contrast black bar code signal are processed and input into a comparator, local maxima and minima on the processed analog signal thereof often fail to cross above or below the reference threshold, and thus such signals are not properly digitized.

In the present invention, the threshold signal output from the threshold generating block can be switched between a standard level and a non-standard level. When scanned by an image sensor, high contrast bar codes often produce an asymmetrical waveform where black signals are stronger than white signals as a result of the "diffusion effect." Because of this phenomena, high contrast bar codes having an MRD of 75 percent or more are preferably digitized by inputting a threshold signal into a comparator which is set at a value of about 40 percent from the black peak and about 60 percent from the white peak. A threshold signal of about 40 percent from the detected black peak, in addition to digitizing high contrast bar code symbols, will also digitize most medium contrast bar code symbols having contrasts ranging from 50 to 75 percent MRD.

A threshold signal of about 40 percent from the detected black peak, however, will not successfully digitize low contrast bar code symbols having contrasts below 50 percent when there are compounding signal processing imperfections. With low contrast bar code symbols, the diffusion effect is significantly reduced. Further, the signal amplitude as compared to the signal amplitude of a high contrast symbol is also significantly reduced. This effect results in a signal where the local maxima and minima are more uniform as compared to a high contrast symbol. Consequently, digitizing such signals with a reference threshold selected to digitize high contrast symbols will more often than not result in a digital signal which cannot be decoded.

By shifting the threshold signal to about 50 percent from the detected black peak, the bar code reader has a greater chance of correctly digitizing and decoding a low contrast bar code. When scanning a low contrast bar code, shifting the threshold toward the white peak with respect to a standard high contrast threshold signal allows additional local maxima of the analog signal from an image sensor output to be digitized. Low contrast bar code symbols are most readily digitized using a threshold signal of about 50 percent from the detected black peak. This threshold signal, in addition to potentially digitizing analog signals representing low contrast bar code symbols having MRD's as low as 25 percent or lower, will also successfully digitize analog signals representing many medium contrast bar code symbols.

A threshold generating block according to the invention includes a voltage divider connected at the output of a peak detector circuit that tracks the maximum and minimum peaks of the analog signal. A threshold generating block can be made to generate multiple thresholds by connecting a threshold switching resistor across a dividing resistor of the voltage divider. By activating the threshold switching resistor, the threshold signal output of the voltage divider can be switched between two threshold signal states: A first or standard threshold signal state suitable for digitizing analog signals generated by scanning medium to high contrast bar codes, and a second, non-standard threshold signal state suitable for digitizing analog signals generated by scanning low to medium contrast bar code symbols. By switching the threshold between two signal states proximate to one another, high to low contrast bar code symbols can be digitized and decoded. The threshold switching resistor of the preferred circuitry may be activated and deactivated through use of a semiconductor switch or switches controlled by control signals generated from a bar code reader's microprocessor.

In one preferred embodiment of the invention, a bar code reader is made to automatically read bar code symbols of varying contrast, from high to medium to low contrast. A bar code reader which automatically reads high to medium to low contrast bar code symbols can be implemented in a bar code reader which repetitively scans a bar code symbol until the symbology of the symbol is determined and the symbol is decoded. After a first scan, a reader according to the invention attempts to digitize the output from an image sensor by comparing the processed output from a sensor to a standard threshold suitable for digitizing analog signals representing medium to high contrast bar code symbols. After a second scan, a reader according to the invention attempts to digitize the image sensor output by comparing the processed output of the sensor to a non-standard threshold suitable for digitizing analog signals representing low to medium contrast bar code symbols. After subsequent scans, a reader according to the invention alternates between attempting to decode a bar code by digitizing a bar code with a standard and then non-standard threshold voltage until the bar code is decoded.

A major feature of the present invention is the use of more than one carefully selected thresholds in a digitizing circuit that digitizes analog signals representing the reflectance function of a bar code symbol. Use of more than one threshold in a digitizing circuit facilitates the digitizing and decoding of bar code symbols of varying contrast.

Another feature of the invention is the use of a limited number of closely spaced threshold voltages in a bar code digitizer. Use of a limited number of closely spaced threshold values facilitates digitizing and decoding of bar code symbols having varying contrasts.

Yet another major feature of the invention is the implementation of the present invention in a bar code reader that repetitively scans a bar code symbol using two alternating closely spaced threshold signals. The alternating scan implementation provides an apparatus that accurately and efficiently digitizes and decodes a wider range of bar code symbols, from high to medium to low contrast bar code symbols.

Still another feature of the invention is the voltage dividing circuitry, wherein one of a plurality voltage outputs can be produced by activating a control signal to operate a semiconductor switch in series with a threshold switching resistor. The voltage dividing circuitry provides effective switching between various threshold signals.

Additional features of the present invention will become apparent to those skilled in the art from a careful reading of the ensuing Detailed Description of the Preferred Embodiments in connection with the accompanying Drawings.

DETAILED DESCRIPTION OF THE PREFERRED EMBODIMENTS

Figure 1:
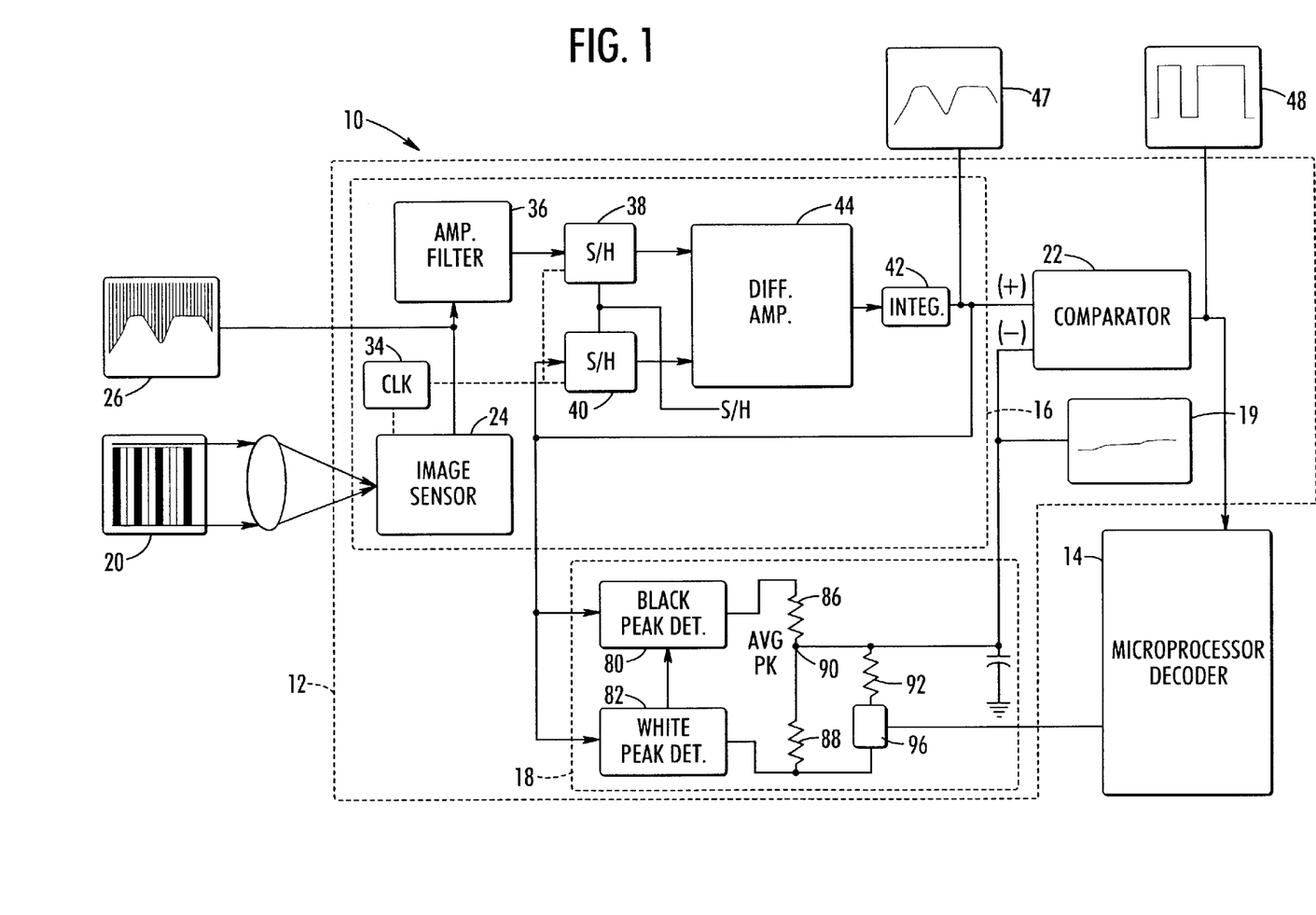
FIG. 1 shows a block diagram of an embodiment of a bar code reader according to the invention.

FIG. 1 shows a block diagram of a bar code reader 10 according to the invention having a digitizer 12 and a microprocessor 14. Digitizer 12 of bar code reader 10 includes a continuous waveform generating block 16 and a threshold generating block 18. Waveform generating block 16 generates a continuous analog signal representative of the continuous reflectance function of bar code symbol 20. Threshold generating block 18 generates a threshold voltage 19. Threshold generating block 18 preferably accumulates reflectance information as symbol 20 is scanned, and uses local maxima and minima in the analog signal to continually update the threshold voltage. However, the threshold voltage could be determined using other values that can be derived from the analog signal, such as average reflectance values associated with black elements e.g. bars and white elements e.g. spaces. Alternatively, the threshold voltage could be a constant.

The threshold generating block 18 outputs to the comparator a threshold voltage with an upper switch limit and lower switch limit, also known as a hysterisis. These limits in the threshold voltage prevent false digitization of noise contained in the analog signal.

In digitizer 12, the outputs from the waveform generating block 16 and threshold generating block 18 are presented to comparator 22. The output of comparator 22 switches from a first logical output when the waveform generator output crosses the upper threshold voltage limit to a second logical output when the waveform generating output crosses the lower threshold voltage limit. In the present invention, the output reference voltage from threshold generating block 18 can be altered to facilitate digitizing of analog signals generated by scanning low contrast bar code symbols.

Waveform generating block 16 of FIG. 1 is preferably a waveform generating block as disclosed in commonly assigned U.S. Pat. No. 5,294,783, incorporated totally by reference herewith. In waveform generating block 16 of FIG. 1, image sensor 24 is a photosensor, which may be a CCD array. Image sensor 24 generates a stepwise analog signal 26 comprising a series of steps, each of which corresponds to an element of the CCD array.

The output from image sensor 24, gated by clock 34, is amplified and filtered with amplifier/filter block 36. The output appears at first sample and hold device 38. Simultaneously, a previous signal corresponding to the signal output of the immediately preceding CCD element is gated by clock 34 from the output of integrator 42 and appears at the output of second sample and hold device 40. The outputs of first and second sample and hold devices 38 and 40 are presented to the input of difference amplifier 44. The output of difference amplifier 44 is proportional to the difference between the signal output amplitudes of the present CCD element and the previous CCD element, as the elemental outputs are transferred through the shift registers of the CCD array.

The output from difference amplifier 44 is presented to integrator 42. Integrator 42 integrates the output of difference amplifier 44 to generate a continuous piece-wise linear approximation 47 of an analog signal representing the continuous reflectance function of bar code symbol 20. The time constant of integrator 42 is preferably chosen to be about equal to the reciprocal of the CCD transfer rate so that the signal output of integrator 42 will be about equal to the value of the voltage previously stored in first sample and hold device 38 at the end of an interval corresponding to the time period between successive signals from image sensor 24.

While a specific and preferred waveform generating block has been described in detail, block 16 could be provided by many alternative circuit formations. For example, a low contrast but adequate continuous analog signal representing the reflectance function of bar code symbol 20 would be generated by simply connecting a low-pass filter to the output of CCD image sensor 24, and then connecting the filter output to comparator 22. A high contrast, albeit more costly waveform generating block could be provided by connecting the output from a high resolution CCD image sensor 24 directly to comparator 22.

In bar code reader 10, the outputs from waveform generating block 16 and reference threshold generating block 18 are compared by comparator 22 which generates a bit serial digital representation of bar code symbol 20. The digitized signal 48 is then presented to microprocessor-based decoder 14 which is programmed to decode the bit serial digital representation of bar code symbol 20. A variety of different techniques can be employed to decode the digital signal which may or may not be microprocessor based or contained in the reader. Such techniques are well known by persons skilled in the art.

Figure 2:
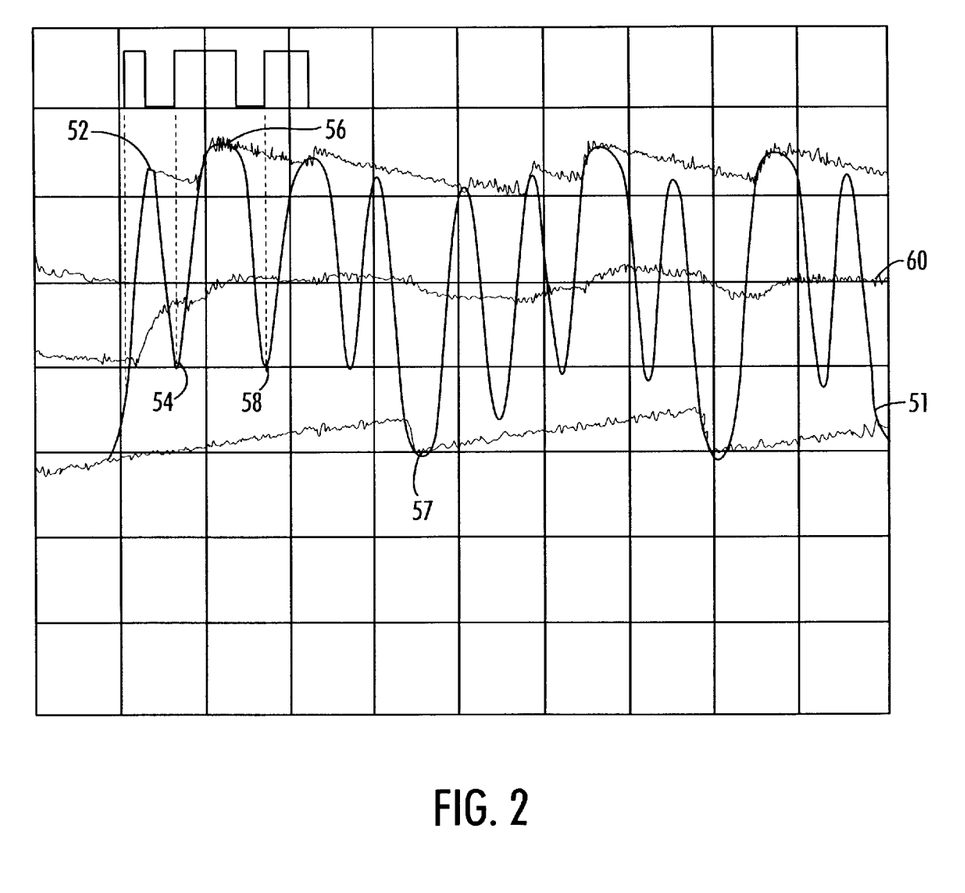
FIG. 2 is a waveform diagram illustrating a typical input into a comparator of an analog waveform digitizer, wherein the analog signal is generated by scanning a high contrast bar code symbol, and wherein the threshold signal is a standard threshold signal.
Figure 3:
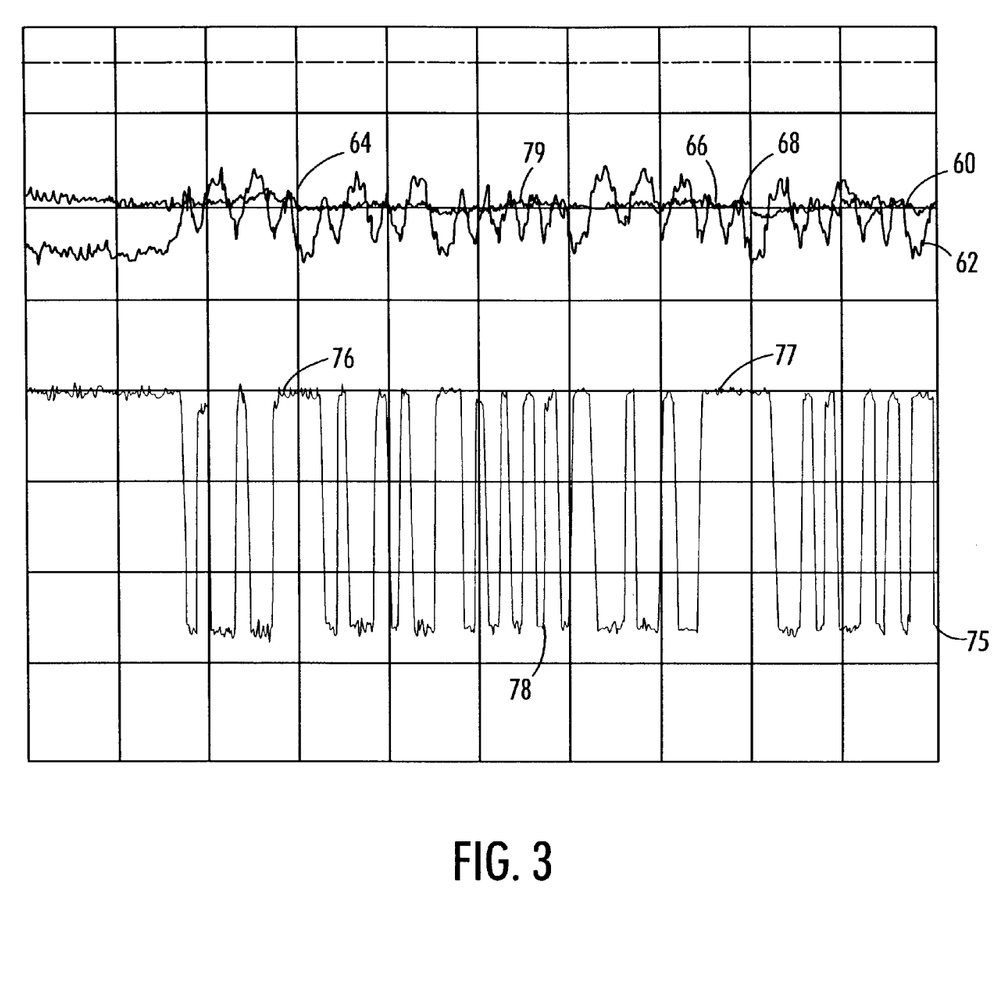
FIG. 3 is a waveform diagram illustrating a typical input into a comparator of an analog waveform digitizer, wherein the analog waveform is generated by scanning a low contrast bar code symbol, and wherein the threshold voltage is a standard threshold voltage. Further shown in FIG. 3 is the comparator output, which illustrates that certain points on the analog signal generated from a low contrast bar code symbol are not digitized when compared to a standard threshold voltage.
Figure 4:
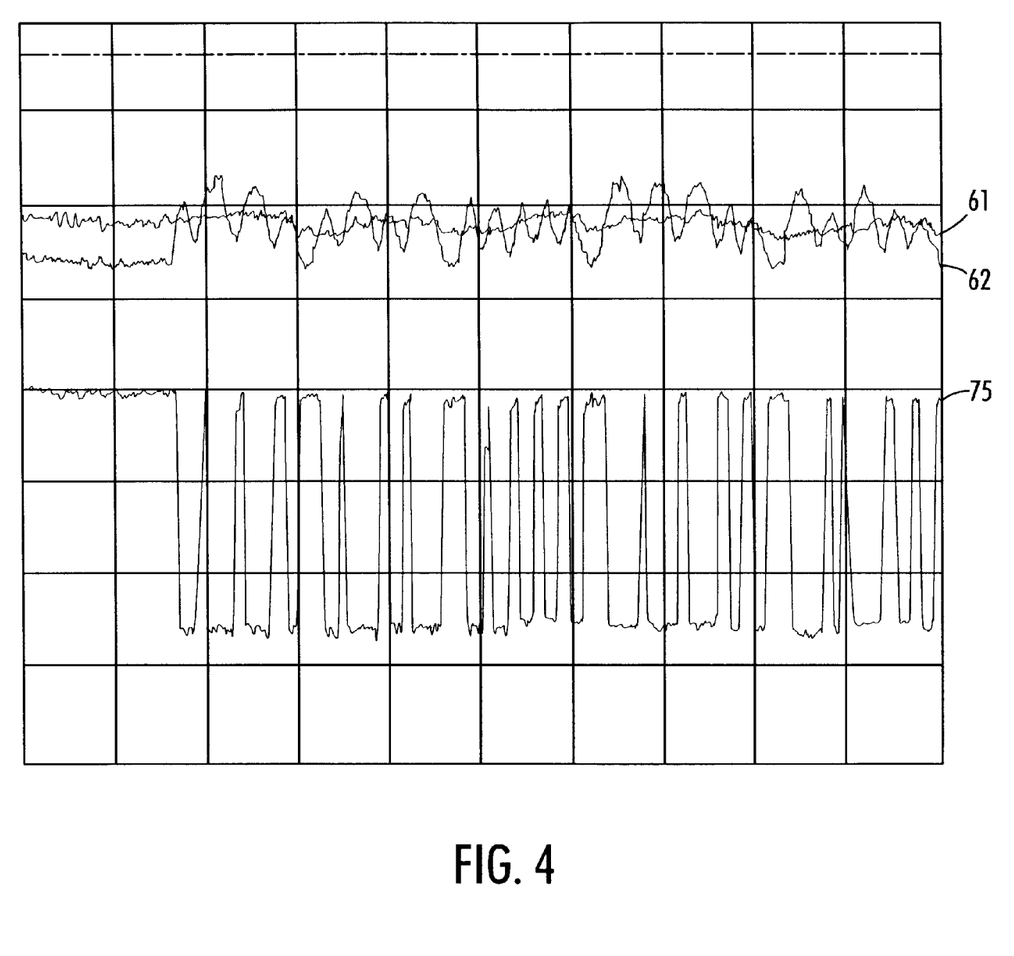
FIG. 4 is a waveform diagram illustrating an input into a comparator of an analog waveform digitizer according to the invention, wherein the analog signal is generated by scanning a low contrast bar code symbol, and wherein the threshold voltage is a non-standard threshold voltage. The comparator output, also shown in FIG. 4, illustrates that additional peaks of the analog signal representing a low contrast bar code symbol are digitized when compared to a non-standard threshold voltage.

Referring now to FIGS. 2–4, a series of waveform diagrams will be discussed which are helpful in understanding the present invention. FIG. 2 illustrates a typical output from a waveform generating block when the bar code is a high contrast bar code. It is seen that when bar code symbol 20 is a high contrast, then peaks such as 52, 54 and 56 of continuous waveform 51 will be well above or well below threshold 60 and thus comparator 22 will easily distinguish between white (high reflectance and below the threshold) and black (low reflectance and above the threshold) elements.

In the waveform diagram of FIG. 2, wherein the detected bar code is a high contrast symbol having an MRD of about 85 percent, then the threshold signal generated by threshold generating block 18 is at a standard level of about 40 percent from the detected black peak detected by threshold generating block 18.

For best results in digitizing analog signals representing high contrast bar code symbols, the threshold signal input into comparator 22 is preferably between about 35 percent and 45 percent, and most preferably about 40 percent from the detected black peak, as shown in FIG. 2. A threshold signal positioned slightly toward the black peak is preferred for digitizing analog signals representing high contrast bar code signals because of the diffusion effect encountered most severely when processing the analog signals representing high contrast bar code symbols.

Figures 5A, 5B:
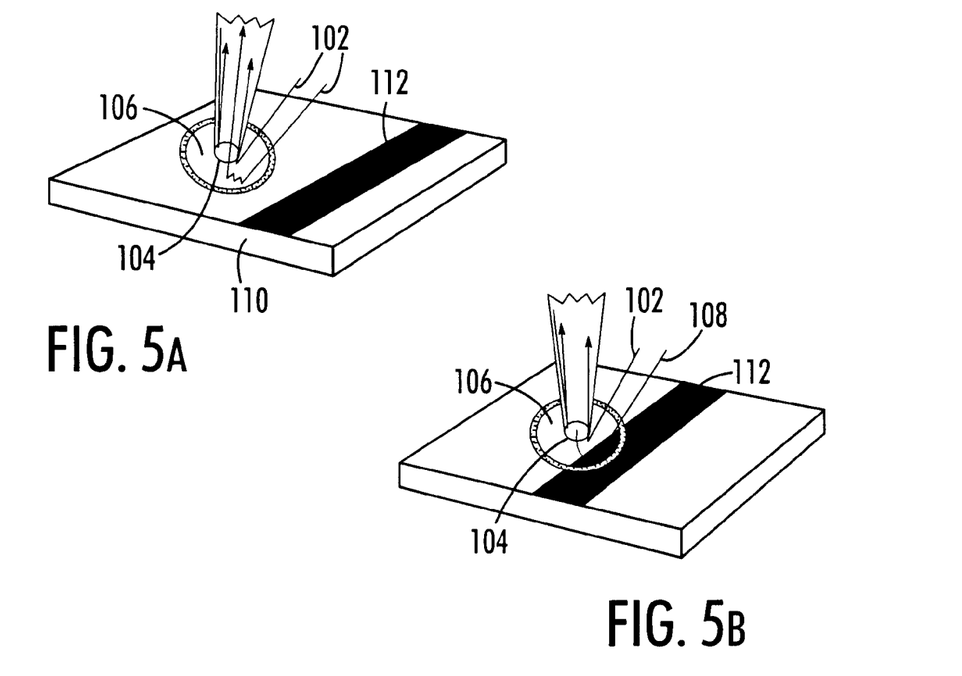
FIGS. 5a, 5b, and 6 are diagrams that are useful in understanding advantages of the present invention.
Figure 6:
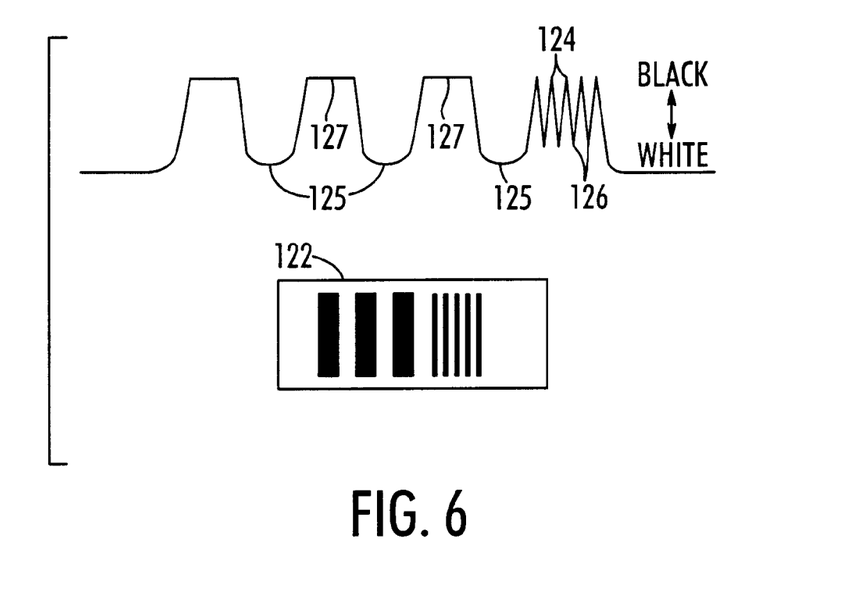

The diffusion effect can be understood with reference to FIGS. 5a and 5b. It results from light, shown representatively as beams 102, that is incident outside the region of sensitivity 104 of a light sensor. Beams 102 enter the substrate 110 on which a pattern is located, and are then scattered internally within the substrate into the region of sensitivity. A fraction of the scattered light is thus ultimately returned to the light sensor via region of sensitivity 104 where it contributes to the received signal level. In scanning applications such as bar code scanning there is another consequence of the diffusion effect. In this application the region of sensitivity travels across dark bars that are separated by fields of light spaces. These spaces are referred to herein as white spaces; however those skilled in the art will understand that areas of high reflectivity are denoted. As the region of sensitivity 104 approaches a dark bar 112, as shown in FIG. 5b, the bar 112 will absorb more light than does a white space of similar dimension. Since some light 108 is absorbed, less is available to scatter into the approaching region of sensitivity. Thus, the diffusion effect differs quantitatively when a bar is near the region of sensitivity than when it is not. This can be appreciated with reference to FIG. 6 which shows an analog waveform 120 generated by a bar code scanner utilizing flood illumination which has scanned bar code symbol 122. It will be apparent that the signal maxima 127 corresponding to the wide dark bars are quite sharp, while the minima 125 corresponding to the intervening white spaces are rounded. Furthermore the peaks 126 corresponding to the narrow white spaces between the narrow dark bars 124 are reduced in amplitude relative to minima 125 corresponding to wide white spaces between the wide dark bars 127. This appearance is predicted by the above discussion of the diffusion effect. If the narrow dark bars could not be resolved due to the modulation transfer function of the reader optical system, the patterns would have been symmetrical about the maxima and minima. While the diffusion effect has been explained in connection with a bar code scanner, it also influences other non-scanning readers of optical patterns as well. In summary, the diffusion effect tends to reduce the apparent white level in the vicinity of certain dark bars while not affecting the black level.

Referring to FIG. 2, it is seen that white peaks 54 and 58, for example, have much smaller amplitudes than white peak 57 as a result of the diffusion effect. It will be recognized that if threshold signal 60 were shifted toward the white peak to a position of about 50 percent from the black peak, then comparator 22 may have difficulty in digitizing low amplitude white peaks such as 54 and 58.

The inventors found that a standard threshold signal level of between 35 and 45 percent, and preferably 40 percent from the black peak, in addition to successfully digitizing analog signals representing high contrast bar code symbols, successfully digitizes analog signals representing many medium contrast bar code symbols having MRD's of between 50 and 75 percent.

However, if bar code symbol 20 is a low contrast black (characterized by grayish bars) or low contrast white (characterized by grayish spaces) bar code symbol then the diffusion effect will have little or no significance. The inventors discovered that a standard threshold setting of between about 35 and 45 percent from the detected black peak suitable for digitizing analog signals generated by scanning medium to high contrast bar code symbols often fails to digitize accurately an analog signal generated by scanning a low contrast bar code symbol.

The waveform diagram of FIG. 3 illustrates an attempt to digitize an analog signal generated by scanning a low contrast white bar code symbol using a standard threshold voltage. In the waveform shown in FIG. 3, analog signal 62 is generated by scanning a low contrast bar code symbol having a minimum reflective difference (MRD) of about 25 percent, and threshold voltage 60 is at a standard level of about 40 percent from the detected black peak.

Aside from the fact that the amplitude of analog signal 62 is smaller relative to the analog signal shown in FIG. 2 (generated by scanning a high contrast bar code symbol), it is seen that several black peaks in analog signal 62 do not cross the threshold voltage, and therefore, are not digitized by comparator 22. Specifically, peaks 64, 66 and 68 do not cross threshold voltage 60 and therefore are not represented as positive peaks in bit serial output 75 of comparator 22, and instead are output as erroneously wide spaces 76 and 77 shown in FIG. 3. The correct signal at 76 should have been a space, bar, space, instead of one large space.

In making the present invention, the inventors discovered that analog signals generated by scanning low contrast bar codes are more readily digitized by comparing the analog signals to a threshold voltage that is closer to the midpoint between the detected black and white peaks. In the waveform of FIG. 4, an analog signal 79 generated by scanning the same low contrast bar code symbol as described in connection with FIG. 3 is successfully digitized by comparing the analog signal to a non-standard threshold 61 that is adjusted to a level approximately at the midpoint between the detected black and white peaks (50 percent from the black peak). Comparing FIG. 4 and FIG. 3, it is seen that by adjusting the threshold voltage toward the white peak, all peaks of the analog signal generated by scanning a low contrast symbol are successfully digitized. The inventors found that a threshold signal at about 50 percent from the detected black peaks, in addition to successfully digitizing analog signals representing many low contrast bar code symbols, successfully digitizes analog signals representing many medium contrast bar code symbols.

According to a major feature of the invention, the threshold voltage which is input into a comparator to digitize an analog signal can be switched between various states, either manually or automatically by signals generated either by hardware circuitry or a microprocessor, to facilitate the digitizing and decoding of analog signals generated by scanning bar code symbols having varying levels of contrast, from high to medium to low contrast bar code symbols.

It would be possible to provide a threshold generating block 18 capable of generating an unlimited number of different thresholds signals. Testing by the inventors has revealed, however, that the performance of comparator 22 in digitizing an analog waveform representing a bar code symbol is optimized with use of only two discreet and closely spaced threshold signal states. Analog signals representing high contrast bar code symbols are optimally digitized with use of threshold signal between about 35 percent and 45 percent, and most preferably about 40 percent. Analog signals representing low contrast bar code symbols, meanwhile, are optimally digitized with use of a threshold signal between about 45 percent and 55 percent, and preferably, about 50 percent. Both of these threshold signals can be used to digitize most analog signals representing medium contrast bar code symbols having MRD's of between 50 and 75 percent. A threshold signal having a value between a standard and non-standard value (for example 45 percent from black, where the standard threshold signal is 40 percent and the non-standard threshold is 50 percent from the black peak) might improve slightly the accuracy with which a bar code reader digitizes analog signals representing medium contrast signals. However, the inventors determined that any benefit resulting from adding a middle threshold signal would normally be outweighed by the increased complexity, cost, and decoding time in a bar code reader having a threshold generating block that generates more than two threshold signals.

Furthermore, the inventors determined that adding threshold signals closer to the black peak than about 35 percent from black, or farther from the black peak than about 55 percent from black would normally produce no significant benefit. Attempting to digitize an analog signal using threshold signals outside of the range of between about 35 percent from black and about 55 percent from black, it was found, normally results in degradation of the first pass read rate. Such first pass read rate failures could be caused by an analog peak which barely crosses the value of a threshold signal. For example, bar 78 of FIG. 3 may be a misrepresentation of black peak 79, which barely crosses the value of threshold 60.

The present invention can be implemented in a variety of ways. For example, if a user knows that substantially all bar code symbols to be scanned are low contrast bar code symbols, the user can manually activate switching hardware in the threshold generating block circuitry which lowers the voltage of the threshold for each scan that is performed until the switching hardware is again activated.

Preferably, however, a bar code reader according to the present invention is made to automatically digitize and decode bar code symbols having varying contrast, from high to medium to low contrast. A bar code reader which automatically reads high to medium to low contrast bar code symbols can be implemented in a bar code reader which repetitively scans a bar code symbol and processes, digitizes, and reads the resulting signal after each scan until the symbology of the symbol is determined and the bar code symbol is decoded. After a first scan, a reader according to the invention attempts to digitize the output from an image sensor by comparing the processed waveform from a sensor to a standard threshold signal suitable for digitizing analog signals representing medium to high contrast bar code symbols. After a second scan, a reader according to the invention attempts to digitize the image signal output by comparing the processed output of the sensor to a non-standard threshold suitable for digitizing analog signals representing low to medium contrast bar code symbols.

After subsequent scans, a reader according to the invention alternates between digitizing the analog signal resulting from each scan with a standard and then non-standard threshold voltage until the bar code symbol is decoded by either the reader or a separate decoder. In one example, a reader according to the invention scans a bar code symbol repetitively, using a threshold voltage of 40 percent from the detected black peak, and then 50 percent from the detected black peak, on alternating scans of the bar code reader.

Now referring again to FIG. 1, a specific hardware implementation of a threshold-switching feature according to the invention will be described in detail. In FIG. 1, the output from integrator 42 is presented to threshold generating block 18. Threshold generating block 18 includes a black peak detector 80 and a white peak detector 82. Each peak detector includes a capacitor for storing voltages representative of peak voltages from continuous analog waveform 47. Black peak detector 80 stores positive peak voltages while white peak detector 82 stores negative peak voltages from waveform 47. Preferably, the time constant of each peak detector is such that the voltage output of the detectors will not decay to zero before a subsequent sample is received by threshold generating block 18.

For producing a threshold voltage signal, the outputs from the black and white peak detectors are presented to a voltage divider, as provided by first and second dividing resistors 86 and 88.

Threshold voltage at 60 can be made switchable by providing threshold switching resistor 92. Threshold switching resistor 92 can be activated by a semiconductor switch 96 controlled by a signal generated by microprocessor 14 or alternating level hardware circuit appropriately synchronized with the scanning operation or reader 10. Further, such control signal could be overridden in order to set the threshold signal at either level depending on the symbol to be digitized. It is seen that when switch 96 is open that the threshold voltage produced at center node 90 will be a voltage between that of peak detectors 80 and 82 as divided by dividing resistors 86 and 88. Preferably, the output produced at center node 90 when switch is open will be a threshold voltage which is suitable for digitizing analog signals representing medium to high contrast bar codes. When switch 96 is closed then the voltage drop across first dividing resistor 86 will increase, and subsequently, threshold voltage produced center node 90 will decrease, preferably to a threshold voltage that is suitable for digitizing analog signals representing low to medium contrast bar code symbols.

In one example of the invention, threshold generating block 18 generates a standard threshold signal of about 40 percent from the detected black peak, and a non-standard threshold signal of about 50 percent from the detected black peak. For providing a standard threshold signal voltage of 40 percent from the detected black peak, dividing resistors 86 and 88 should be sized according to Eq. 1:

$$R86/(R86+R88)=0.40 \quad \text{(Eq. 1)}$$

For providing a non-standard threshold signal voltage of 50 percent from the detected black peak, dividing resistor 86 and 88 and threshold switching resistor 92 should be sized according to Eq. 2:

$$R86/(R86+(R88R92/(R88+R92)))=0.50 \quad \text{(Eq. 2)}$$

It will be recognized that additional alternative threshold voltages can be provided by connecting supplementary switch-controlled threshold switching resistors in parallel with dividing resistor 88 or resistor 86. Also, multiple digital signals for use in decoding a bar code symbol can be generated simultaneously by presenting the output from several voltage dividers connected across the peak detecting circuit, into several parallel comparators, each having input therein the output from waveform generating block 16.

While this invention has been explained with reference to the structure disclosed herein, it is not confined to the details set forth and this application is intended to cover any modification and changes as may come within the scope of the ensuing claims.

What is claimed is:

1. In an indicia reader for digitizing code symbols that include black and white code elements in combination:

image sensing means for scanning said bar code elements, and for generating therefrom voltages that vary in accordance with the blackness and whiteness of said code elements;

waveform generating means in electrical communication with said image sensing means for generating a signal varying in accordance with the blackness and whiteness of said code elements;

black and white peak detecting means responsive to said signal for generating black and white peak tracking signals which approximately track the peak black and peak white values of said signal;

threshold generating means for generating a threshold signal that varies in accordance with changes in said black and white peak tracking signals;

comparing means responsive to said signal and to said threshold signal for generating a digital signal for use in decoding said symbols;

threshold switching means for switching said threshold signal between a first state, wherein said threshold signal is a dynamically variable signal bearing a first predetermined relationship to said peak values, and a second state wherein said threshold signal is a dynamically variable signal bearing a second predetermined relationship to said peak values; and control means in communication with said threshold switching means and said image sensing means, for causing said threshold switching means to switch said threshold signal between said first state and said second state during alternate scans or sets of scans by said image sensing means.

2. The indicia reader of claim 1, wherein said threshold signal in said first state is a standard threshold signal suitable for digitizing analog signals representing medium to high contrast code symbols, and wherein said threshold signal in said second state is a non-standard threshold signal suitable for digitizing analog signals representing low to medium contrast code symbols.

3. The indicia reader of claim 1, wherein said first state of said threshold signal is between about 35 percent and about 45 percent from said black peak, and wherein said second state of said threshold signal is between about 45 percent and about 55 percent from said black peak, whereby said first state is suitable for digitizing analog signals representing medium to high contrast code symbols, and said second state is suitable for digitizing analog signals representing low to medium contrast code symbols.

4. The indicia reader of claim 1, wherein said first state of said threshold signal is 40 percent from said black peak, and wherein said second state of said threshold signal is 50 percent from said black peak, whereby said first state is suitable for digitizing analog signals representing medium to high contrast code symbols, and said second state is suitable for digitizing analog signals representing low contrast code symbols.

5. The indicia reader of claim 1, wherein said threshold signal is a two-state signal switchable between a first state wherein said threshold signal is between about 35 percent and about 45 percent from said black peak, and a second state wherein said threshold signal is between about 45 percent and about 55 percent from said black peak.

6. The indicia reader of claim 1, further comprising:

manual control means in electrical communication with said threshold switching means for manually adjusting said threshold signal between said first state and said second state.

7. The indicia reader according to claim 1, wherein said threshold switching means comprises:

first and second dividing resistors electrically connected in series across an output of said black and white peak detecting means, said first and second dividing resistors having a node therebetween, said threshold signal appearing at said node;

a threshold switching resistor electrically connected in parallel across one of said dividing resistors; and a switch electrically connected in series with said threshold switching resistor switchable between an open position wherein said threshold signal is in said first state, and a second position wherein said threshold is in said second state.

8. The indicia reader of claim 1, further comprising decoding means responsive to said digital signal for decoding said symbols.

9. An indicia reader for digitizing bar code symbols that include black and white code bars comprising:

an image sensor for scanning said bar code bars, and for generating therefrom voltages that vary in accordance with the blackness and whiteness of said code bars;

a waveform generating block in electrical communication with said image sensor for generating a signal varying in accordance with the blackness and whiteness of said code bars;

a black and white peak detecting circuit responsive to said signal for generating black and white peak tracking signals which approximately track the peak black and peak white values of said signal;

a threshold generating block for generating a threshold signal that varies in accordance with changes in said black and white peak tracking signals;

a comparator responsive to said signal and to said threshold signal for generating a digital signal for use in decoding said bar code symbols;

threshold switching means for switching said threshold signal between a first state, wherein said threshold signal is a dynamically variable signal bearing a first predetermined relationship to said peak values, and a second state wherein said threshold signal is a dynamically variable signal bearing a second predetermined relationship to said peak values; and a controller in communication with said threshold switching means and said image sensor, for causing said threshold switching means to switch said threshold signal between said first state and said second state during alternate scans or sets of scans by said image sensor.

10. The indicia reader of claim 9, wherein said threshold signal in said first state is a standard threshold signal suitable for digitizing analog signals representing medium to high contrast bar code symbols, and wherein said threshold signal in said second state is a non-standard threshold signal suitable for digitizing analog signals representing low to medium contrast bar code symbols.

11. The indicia reader of claim 9, wherein said first state of said threshold signal is between about 35 percent and about 45 percent from said black peak, and wherein said second state of said threshold signal is between about 45 percent and about 55 percent from said black peak, whereby said first state is suitable for digitizing analog signals representing medium to high contrast bar code symbols, and said second state is suitable for digitizing analog signals representing low to medium contrast bar code symbols.

12. The indicia reader of claim 9, wherein said first state of said threshold signal is 40 percent from said black peak, and wherein said second state of said threshold signal is 50 percent from said black peak, whereby said first state is suitable for digitizing analog signals representing medium to high contrast bar code symbols, and said second state is suitable for digitizing analog signals representing low contrast bar code symbols.

13. The indicia reader of claim 9, wherein said threshold signal is a two-state signal switchable between a first state wherein said threshold signal is between about 35 percent and about 45 percent from said black peak, and a second state wherein said threshold signal is between about 45 percent and about 55 percent from said black peak.

14. The indicia reader of claim 9, further comprising:

manual control means in electrical communication with said threshold switching means for manually adjusting said threshold signal between said first state and said second state.

15. The indicia reader according to claim 9, wherein said threshold switching means comprises:

first and second dividing resistors electrically connected in series across an output of said black and white peak detecting circuit, said first and second dividing resistors having a node therebetween, said threshold signal appearing at said node;

a threshold switching resistor electrically connected in parallel across one of said dividing resistors; and a switch electrically connected in series with said threshold switching resistor switchable between an open position wherein said threshold signal is in said first state, and a second position wherein said threshold is in said second state.

16. The indicia reader of claim 9, further comprising decoding means responsive to said digital signal for decoding said symbols.

17. In an indicia reader for digitizing code symbols that include black and white code elements in combination:

image sensing means for scanning said bar code elements, and for generating therefrom voltages that vary in accordance with the blackness and whiteness of said code elements;

waveform generating means in electrical communication with said image sensing means for generating a signal varying in accordance with the blackness and whiteness of said code elements;

black and white peak detecting means responsive to said signal for generating black and white peak tracking signals which approximately track the peak black and peak white values of said signal;

threshold generating means for generating a threshold signal that varies in accordance with changes in said black and white peak tracking signals;

comparing means responsive to said signal and to said threshold signal for generating a digital signal for use in decoding said symbols; and manual adjusting means for manually adjusting said threshold signal to a state wherein said threshold signal bears a substantially constant relationship to said peak values.

* * * * *